United States Patent [19]

Shellberg

[11] 4,031,762

[45] June 28, 1977

[54] MULTI-SPEED POWERSHIFT TRANSMISSIONS

[75] Inventor: James E. Shellberg, Jackson, Mich.

[73] Assignee: Clark Equipment Company, Buchanan, Mich.

[22] Filed: July 30, 1975

[21] Appl. No.: 600,254

[52] U.S. Cl. .................................. 74/15.63; 74/331
[51] Int. Cl.² ..................... F16H 3/08; F16H 37/06
[58] Field of Search ............ 74/15.6, 15.63, 15.66, 74/325, 329, 331, 356

[56] References Cited

UNITED STATES PATENTS

| | | | |
|---|---|---|---|
| 2,661,634 | 12/1953 | Bechman et al. | 74/15.63 X |
| 2,669,880 | 2/1954 | Brock et al. | 74/15.6 X |
| 2,793,533 | 5/1957 | Swenson et al. | 74/15.63 |
| 2,975,656 | 3/1961 | Haverlender | 74/15.63 |
| 3,710,637 | 1/1973 | Fisher et al. | 74/331 |
| 3,722,301 | 3/1973 | Crooks | 74/15.63 |
| 3,739,647 | 6/1973 | Crooks | 74/15.63 |
| 3,893,345 | 7/1975 | Sisson et al. | 74/15.66 X |

FOREIGN PATENTS OR APPLICATIONS

| | | | |
|---|---|---|---|
| 1,111,518 | 7/1961 | Germany | 74/331 |
| 1,625,179 | 6/1970 | Germany | 74/325 |

*Primary Examiner*—Samuel Scott
*Assistant Examiner*—Carl F. Pietruszka
*Attorney, Agent, or Firm*—Ernst H. Ruf

[57] ABSTRACT

A known family of multi-speed constant-mesh gear reversible powershift transmissions has a basic structure that includes a plurality of drivingly connected shafts, with all of these shafts lying in a common plane. A plurality of gear trains selectively drives the output shaft at various speed ratios, and pluralities of clutches are used for connecting several of the shafts and for connecting various ones of the gears to various shafts for conjoint rotation therewith. The improvement resides in the modification of an inline transmission to a drop-type transmission which permits the interposition of a power takeoff shaft that is operatively connected to and axially aligned with the input shaft.

1 Claim, 1 Drawing Figure

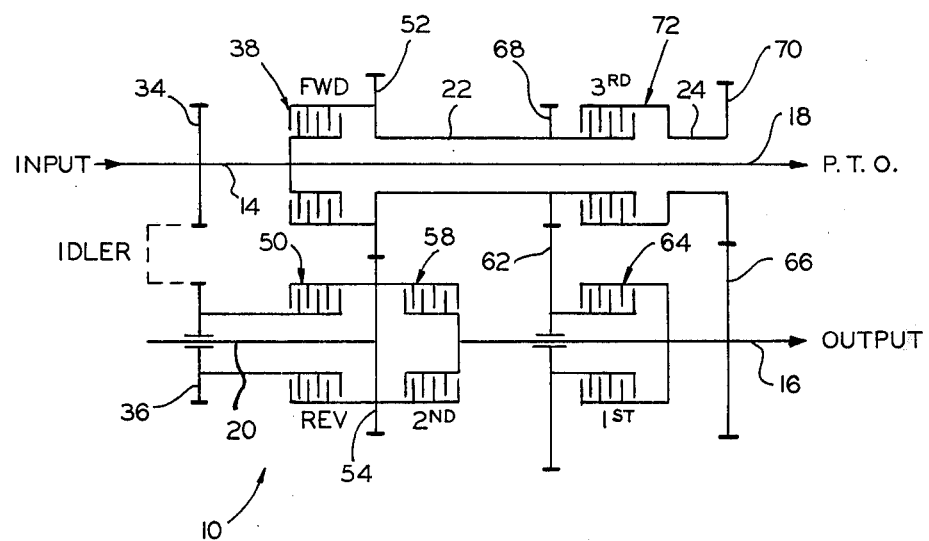

MULTI-SPEED POWERSHIFT TRANSMISSIONS

BACKGROUND OF THE INVENTION

1. Field of the Invention

The field of art to which this invention pertains includes power transmission mechanisms and more specifically such mechanisms as have multiple forward and reverse constant-mesh gearing.

2. Description of the Prior Art

In multiple speed constant-mesh-gear reversible powershift type transmissions, it is desirable to arrange the transmissions' major components, or basic structure, in such a way that a variety of additional components or modifications may easily be added to this basic mechanism or structure. Transmissions of this type are mainly utilized in off-highway heavy duty vehicles and construction equipment which often are manufactured for specific requirements in only limited numbers. Thus, having a basic transmission structure which can readily be adapted to meet unique criteria is of paramount importance. Not only is cost reduced, but dependability and availability are improved. Such a family of basic transmissions is disclosed in U.S. Pat. No. 3,893,345 (issued July 8, 1975) to Sisson et al, which patent is also assigned to the assignee of this invention.

The main purpose of this invention is to provide a further modification of the basic or generic transmission mechanism disclosed in the aforesaid patent so that this basic mechanism may be easily modified to fulfill yet a further set of common requirements. This family of transmissions has a common denominator in the fact that regardless of the number of shafts utilized, they always lie in a common plane, preferably vertical. This allows the production of a family of constant-width transmissions, which not only greatly facilitate installation procedures but also permits the use of large numbers of common parts. The particular transmission embodiment wherein the improvement is applicable is a transmission wherein the output shaft is axially aligned with the input shaft and thus may be designated an "inline" transmission.

SUMMARY OF THE INVENTION

In carrying out this invention, the preferred embodiment thereof has a basic structure which provides a transmission having an input shaft, a first shaft or countershaft lying in a common plane with the input shaft, a power takeoff shaft axially aligned with and operatively connected to the input shaft, a first sleeve shaft coaxial with the power takeoff shaft and axially aligned with the input shaft, a second sleeve shaft coaxial with the power takeoff shaft and axially aligned with the first sleeve shaft, and an output shaft axially aligned with the first shaft, with all of these shafts lying in a common plane. An input shaft gear is drivingly connected with a first gear journalled for rotation on the first shaft, with first clutch means connecting this first gear to the first shaft and second clutch means connecting the input shaft to the first sleeve shaft for conjoint rotation therewith. Second and third gears are fixed, respectively, to the first sleeve shaft and the first shaft and in constant mesh with one another. A third clutch means connects the output shaft with the first shaft, with a fourth gear being journalled for rotation on the output shaft and a fourth clutch means connecting this fourth gear to the output shaft for conjoint rotation therewith. This fourth gear is in constant mesh with a fifth gear fixed to the first sleeve shaft. A second sleeve shaft is coaxial with the power takeoff shaft and a fifth clutch means is utilized for connecting the second sleeve shaft to the first sleeve shaft, with a sixth gear, fixed to the second sleeve shaft, being in constant mesh with a gear affixed to the output shaft.

The transmission of this invention is an adaptation of the basic transmission structure disclosed in FIG. 8 of the noted patent to Sisson et al. This prior art structure, which takes the form of an inline transmission (i.e. having axially aligned input and output shafts) and having axially aligned but vertically displaced first and second countershafts, is modified in the present invention in that the second countershaft is converted to, i.e. exchanged for, an output shaft, thus producing a "drop" transmission, and the original output and intermediate shafts are converted to, i.e. exchanged for, sleeve shafts so as to permit the coaxial interposition therethrough of a power takeoff shaft. The power takeoff shaft is operatively connected to the input shaft and can be utilized for driving any desired accessory device.

The present invention further comprises an arrangement of components in a multi-speed reversible powershift transmission, which arrangement provides at least two speed and three speed embodiments of a powershift transmission device.

The principal object, features and advantages of this invention will be more readily understood by persons skilled in the art when following the detailed description in conjunction with the drawing.

BRIEF DESCRIPTION OF THE DRAWING

The single drawing FIGURE is a simplified schematic representation of a multi-speed constant-mesh-gear reversible powershift transmission having an inline power takeoff shaft.

DESCRIPTION OF THE PREFERRED EMBODIMENT

Referring now to the single drawing FIGURE, the reference numeral 10 generally denotes a multi-speed constant-mesh-gear reversible powershift type transmission having a plurality of shafts, gears and bidirectionally engageable clutches. Transmission 10 represents an improvement over the structure shown in FIG. 7 to 9 of U.S. Pat. No. 3,893,345 (issued July 8, 1975) to Sisson et al which is also assigned to the assignee of this invention.

From the schematic representation of transmission 10, it may readily be ascertained that the input and output shafts lie in the same vertical plane, with the latter being vertically displaced from the former.

Transmission 10 has a housing (not shown) in which an input shaft 14, output shaft 16 and shafts 18, 20, 22 and 24 are journalled for rotation. Input shaft 14 is driven, for example, by means of the turbine of a hydro-dynamic torque converter (not shown) of known construction to which shaft 14 is connected, with the torque converter being in turn connected to any suitable prime mover, such as an internal combustion engine (not shown). In addition, the torque converter impeller may also drive one or more pumps (not shown) of any well-known construction, with at least one of the pumps serving to provide pressurized fluid to operate the various fluid actuated clutches as well as to lubricate the gears and bearings associated with transmission 10.

Connected to input shaft 14 is an input gear 34 which is drivingly connected by means of an idler gear (not shown) with a gear 36, with gear 36 being mounted for rotation, i.e., mounted and capable of being rotated with respect to, shaft 20. Input shaft 14 is operatively connected to power takeoff or accessory drive shaft 18 for conjoint rotation therewith, with shaft 18 being axially aligned with input shaft 14. Coaxially surrounding shaft 18 and thus axially aligned with input shaft 14 is a sleeve shaft 22 which can be connected to input shaft 14 for conjoint rotation therewith by means of a clutch 38. Clutch 38 preferably is a multiple plate or multiple disc fluid-pressure-actuated-type clutch of well-known construction, an example of which is fully discussed and also shown in the previously-mentioned patent to Sisson et al. As is well known in the art, clutch 38 includes a plurality of interleaved friction plates splined alternately to the hub and drum of the clutch, and clutch 38 is engaged by supplying pressurized fluid behind a piston which serves to press the interleaved friction plates together so that the clutch hub is frictionally connected to the clutch drum through the plates, as is common in powershift transmissions.

Gear 36 can be connected to shaft or countershaft 20 for conjoint rotation therewith by means of a fluid-actuated multiple plate clutch 50 which is substantially similar to clutch 38, and so will not be described further.

At this time, it will be noted that a gear 52 is integral with the drum of clutch 38 and meshes with another gear 54, which is integral with the drum of clutch 50. It should be clear at this time that shafts 18 and 22 are axially aligned with input shaft 14 and that shaft or countershaft 20 is vertically aligned with, or in the same vertical plane, as input shaft 14. Shafts 20 and 22 are interconnected by means of meshing gears 54 and 52 so that for any given direction of rotation of one of these shafts, the other shaft will operate in the opposite direction. In addition, since gear 34 is drivingly connected, via an idler gear, with gear 36, they, therefore, rotate in the same direction. Thus, engagement of clutch 38 conditions transmission 10 for what may be arbitrarily designated "forward drive" and engagement of clutch 50 conditions the transmission for what may again be arbitrarily termed "reverse drive", depending, of course, on the direction of rotation of input shaft 14.

Output shaft 16, which is axially aligned with shaft or countershaft 20, can be connected to shaft 20 for conjoint rotation therewith by the engagement of another multiple plate fluid-actuated-type clutch 58, with clutch 58 allochiral to clutch 50 and sharing a common web therewith. A gear 62 is mounted for rotation on output shaft 16 and can be connected thereto for conjoint rotation therewith by means of a further clutch 64 which again is substantially similar to previously described clutch 38. In addition, a gear 66 is fixed to output shaft 16 for conjoint rotation therewith, and gear 62 is in constant mesh with a gear 68 affixed to sleeve shaft 22 for conjoint rotation therewith.

Axially aligned with shaft 22 and coaxially surrounding shaft 18, is a further sleeve shaft 24 having a gear 70 affixed thereon, with gear 70 being in constant mesh with output shaft gear 66. Sleeve shaft 24 can be connected to sleeve shaft 22 for conjoint rotation therewith by means of yet a further clutch 72, with clutch 72 also being substantially similar to previously described clutch 38.

By engaging clutch 38, the transmission is conditioned for forward drive, while by disengaging clutch 38 and by engaging clutch 50, the transmission is conditioned for reverse drive. At this point, it will be seen, since all of the gears are in constant mesh, that a first speed ratio is provided, in both forward and reverse, by engaging clutch 64 so that output shaft 16 is driven through the gear trains comprising either gears 68 and 62 or 34, 36, 54, 52, 68 and 62. A second speed ratio is provided, in both forward and reverse, by engaging clutch 58 so that output shaft 16 is driven through the gear trains comprising either gears 52 and 54 or 34 and 36. A third speed ratio is provided, in both forward and reverse, by engaging clutch 72 so that output shaft 16 is driven through the gear trains comprising either gears 70 and 66 or 34, 36, 54, 52, 70 and 66.

In view of the foregoing description, it will be apparent that a first forward speed ratio is provided by the engagement of clutches 38 and 64, a second speed ratio is provided by the continued engagement of clutch 38 and the engagement of clutch 58 instead of clutch 64, and a third speed ratio is provided by the continued engagement of clutch 38 and the engagement of clutch 72 instead of clutch 58. By engaging clutches 50 and 64, a low reverse speed ratio is provided, and by releasing clutch 64 and engaging clutch 58, a second reverse speed ratio is provided, with a third reverse speed ratio being provided by the engagement of clutches 50 and 72.

It should be noted that in transmission 10 the input and output shafts are parallel and lie in a common vertical plane, with all of the remaining shafts also lying in the same vertical plane.

An analysis of the structural configuration of transmission 10 will show that power takeoff or accessory drive shaft 18 is axially aligned with and turns continuously with input shaft 14. In addition, accessory drive shaft 18 is parallel with and lies in the same vertical plane as output shaft 16.

Transmission 10 is a adaptation of the basic transmission structure disclosed in FIG. 8 of the previously noted patent to Sisson et al. This prior art structure takes the form of an inline transmission, i.e., having axially aligned input and output shafts, and having axially aligned but vertically displaced first and second countershafts. This structure is modified in the present invention in that the second countershaft is converted to, i.e. exchanged for, output shaft 16 and the original output and intermediate shafts are converted to, i.e. exchanged for, sleeve shafts 24 and 22 respectively, so as to permit the coaxial interposition therethrough of power takeoff shaft 18. Power takeoff shaft 18, by reason of its axial alignment and operative connection with input shaft 14, is thus driven at torque converter turbine speed and can be utilized for driving any desired type of accessory or auxiliary device.

If a particular application requires but a two-speed transmission, this can readily be accomplished by deleting either shaft 24 (together with clutch 72 as well as gears 70 and 66) or clutch 64 (together with gears 62 and 68) depending, of course, on the gear ratios desired.

From the foregoing, it is believed that those familiar with the art will readily recognize and appreciate the novel concepts and features of the present invention. Obviously, while the invention has been described in relation to only one preferred embodiment, numerous variations, changes and substitutions of equivalents will present themselves to persons skilled in the art and may be made without necessarily departing from the scope and principles of this invention. As a result, the embodiment described herein is subject to various modifications, changes and the like, with the scope of this invention being determined solely by reference to the claims appended hereto.

What is claimed is:

1. In an in-line multi-speed constant-mesh-gear reversible powershift transmission of the type utilizing bidirectionally engageable multiple-disc fluid-pressure-actuated clutches, comprising in combination: an input shaft; a first gear fixed to said input shaft; a first shaft; a second gear journalled for rotation on said first shaft and drivingly connected with said first gear so as to rotate in the same direction therewith; a second shaft axially aligned with said input shaft; first clutch means for connecting said input shaft with said second shaft; second clutch means for connecting said second gear to said first shaft for conjoint rotation therewith; a third gear fixed to said second shaft; a fourth gear fixed to said first shaft and in mesh with said third gear; a third shaft axially aligned with said first shaft; third clutch means for connecting said third shaft with said first shaft; a fifth gear journalled for rotation on said third shaft; fourth clutch means for connecting said fifth gear to said third shaft; a sixth gear fixed to said third shaft, said fifth gear being located intermediate said third clutch means and said sixth gear; an output shaft axially aligned with said input shaft; a seventh gear fixed to said output shaft and in mesh with said sixth gear; an eighth gear fixed to said second shaft and in mesh with said fifth gear and fifth clutch means for connecting said second shaft to said output shaft for conjoint rotation therewith; a method for both modifying said in-line transmission to a transmission having a vertically offset output shaft, with respect to said input shaft, and adding an accessory drive shaft coaxial with said input shaft, said method comprising:
   a. exchanging said third shaft for an output shaft that is vertically displaced relative to said input shaft;
   b. exchanging said output shaft that is axially aligned with said input shaft for a first sleeve shaft concentric with said input shaft;
   c. exchanging said second shaft for a second sleeve shaft, said second sleeve shaft being axially aligned with said first sleeve shaft; and
   d. adding an accessory drive shaft, said accessory drive shaft being axially aligned with and operatively connected with said input shaft for conjoint rotation therewith and coaxial with said first and second sleeve shafts, whereby exchanging said third shift, said axially aligned output shaft and said second shaft, as well as adding said accessory drive shaft, produces a transmission having a vertically offset output shaft with respect to said input shaft and permits the coaxial interposition of said accessory drive shaft through said first and second sleeve shafts.

* * * * *